UNITED STATES PATENT OFFICE.

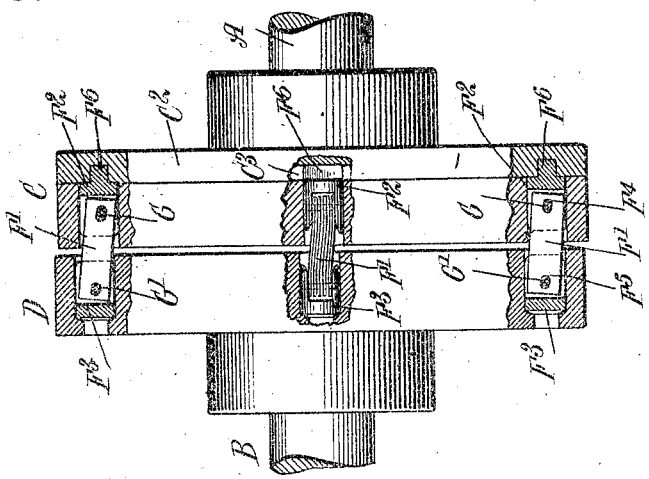

WILLIAM J. FRANCKE, OF NEW BRUNSWICK, NEW JERSEY.

FLEXIBLE COUPLING.

1,029,355.

Specification of Letters Patent. Patented June 11, 1912.

Application filed January 25, 1912. Serial No. 673,282.

*To all whom it may concern:*

Be it known that I, WILLIAM J. FRANCKE, a citizen of the United States, and a resident of New Brunswick, in the county of Middlesex and State of New Jersey, have invented a new and Improved Flexible Coupling, of which the following is a full, clear, and exact description.

The invention relates to shaft couplings, and its object is to provide a new and improved flexible coupling arranged to insure proper transmission of the power from one shaft to another even should such coupled shafts be out of line or out of center. For the purpose mentioned use is made of coupling members secured to the adjacent ends of the shafts to be coupled, and flexible connecting members connecting the coupling members with each other, each connecting member comprising a plurality of superimposed flat springs and keepers on the ends of the said superimposed flat springs and engaging the coupling members.

A practical embodiment of the invention is represented in the accompanying drawings forming a part of this specification, in which similar characters of reference indicate corresponding parts in all the views.

Figure 1 is a face view of the coupling as applied, parts being broken out and parts being shown in section; Fig. 2 is a side elevation of the coupling as applied, parts being in section and the shaft being shown out of line; Fig. 3 is a similar view of the same, the shafts being shown out of center; and Fig. 4 is an enlarged perspective view of one of the flexible connecting members.

On the adjacent ends of the shafts A and B to be coupled together are secured the coupling members C and D, preferably in the form of disks fastened by keys or similar fastening means E to the shafts A and B. The coupling members C and D are flexibly connected with each other at their adjacent faces by the use of flexible connecting members F each formed of a plurality of superimposed flat steel springs $F'$ fitting at their ends into forks of keepers $F^2$ and $F^3$ provided with transverse pins G, $G'$ passing through elongated slots $F^4$, $F^5$ arranged in a series of superimposed flat springs $F'$, as will be readily understood by reference to Figs. 2 and 3.

The keepers $F^2$, $F^3$ are preferably cylindrical and fit into correspondingly-shaped recesses or apertures $C'$, $D'$ formed in the coupling members C and D and arranged in a circle, the center of which coincides with the axis of the corresponding shaft A or B. The keeper $F^2$ is provided on its outer end with a flat offset $F^6$ fitting into an annular groove $C^3$ formed in the inner face of a ring $C^2$ secured by screws H or other fastening means to the outer face of the coupling member C. The flat offset $F^6$ holds each connecting member against turning in the coupling members C and D, and the said offset $F^6$ stands at a right angle to the springs $F'$ so as to hold the same approximately in radial position relative to the shafts A and B, that is, to hold the said springs $F'$ in such a position that they flex in the direction of the turning movement of the coupling, as will be readily understood by reference to Figs. 2 and 3. It will also be noticed by reference to Fig. 3 that the springs $F'$ are free to turn on the pins G and $G'$ as their fulcrums in case the shafts A and B are out of center, as indicated in Fig. 3, and by having the pins G and $G'$ extending through the elongated slots $F^4$, $F^5$, the shafts A and B may stand out of line as shown in Fig. 2.

From the foregoing it will be seen that by the arrangement described the coupling members C and D are at all times connected with each other by the flexible coupling members F to insure proper transmission of the power from one shaft to another even if such shafts should be out of line or out of center.

The coupling shown and described is very simple and durable in construction and permits its use on shafts driven at low or high speeds.

Having thus described my invention, I claim as new and desire to secure by Letters Patent:

1. In a coupling, the combination of coupling members adapted to be secured to the adjacent ends of two shafts, flexible connecting members connecting the said coupling members with each other, each flexible connecting member having a plurality of superimposed flat springs, keepers on the ends of the said superimposed flat springs, the keepers engaging recesses in the faces of the said coupling members, and a connection between one of the keepers of each connecting member and the corresponding coupling member for preventing the connecting members from turning in the coupling members.

2. In a coupling, the combination of coupling members adapted to be secured to the adjacent ends of two shafts, flexible connecting members connecting the said coupling members with each other, each flexible connecting member having a plurality of superimposed flat springs provided near their ends with elongated slots, keepers receiving the ends of the said flat springs of each connecting member, pins on the keepers and extending through the said flat spring slots, and a connection between one of the keepers of each connecting member and the corresponding coupling member for preventing the connecting members from turning in the coupling members.

3. In a coupling, the combination of coupling members adapted to be secured to the adjacent ends of two shafts, a ring on the outer face of one of said coupling members, flexible connecting members connecting the said coupling members with each other, each flexible connecting member having a plurality of superimposed flat springs, keepers on the ends of the said superimposed flat springs, the keepers engaging recesses in the faces of the said coupling members, and means on one of the keepers of each connecting member and engaging the said ring for holding the connecting members against turning in the coupling members.

4. In a coupling, the combination of coupling disks adapted to be secured to the adjacent ends of two shafts, flexible connecting members each having keepers at the ends thereof, the keepers fitting into corresponding recesses in the coupling disks, and a ring on the outer face of one of said disks and provided with a groove, one of the keepers of each connecting member having an extension fitting in the groove of the said ring.

5. In a coupling, the combination of coupling members adapted to be secured to the adjacent ends of two shafts, flexible connecting members connecting the said coupling members with each other, each flexible connecting member having a plurality of superimposed flat springs, the said connecting members being arranged in a circle and the flat springs being capable of flexing in the direction of the turning movement of the coupling, and keepers in which the ends of the springs of each connecting member are held, the keepers slidingly engaging recesses in the said coupling members, one of the keepers of each connecting member being provided with a flat offset fitting a groove in the corresponding coupling member.

6. In a coupling, the combination of coupling disks adapted to be secured to the adjacent ends of shafts to be coupled, the disks being provided on their opposite faces with recesses arranged in circles near the margins of the disks, a ring on the outer face of one of said disks, the ring being provided with an annular groove registering with the recesses in the disk, and connecting members connecting the coupling disks with each other, each connecting member comprising a series of superimposed flat springs and keepers on the ends of the series of springs, the keepers engaging the recesses in the said disks and one of the keepers having a flat offset extending into the groove of the said ring to hold the flat springs approximately in position to flex in the direction of the turning movement of the coupling.

7. In a coupling, the combination of coupling disks adapted to be secured to the adjacent ends of shafts to be coupled, the disks being provided on their opposite faces with recesses arranged in circles near the margins of the disks, a ring on the outer face of one of said disks, the ring being provided with an annular groove registering with the recesses in the disk, and connecting members connecting the coupling disks with each other, each connecting member comprising a series of superimposed flat springs and keepers on the ends of the series of springs, the keepers engaging the recesses in the said disks and one of the keepers having a flat offset extending into the groove of the said ring to hold the flat springs approximately in position to flex in the direction of the turning movement of the coupling, the series of springs being provided near each end with elongated slots, and pins on the said keepers extending through the said slots.

In testimony whereof I have signed my name to this specification in the presence of two subscribing witnesses.

WILLIAM J. FRANCKE.

Witnesses:
 THEO. G. HOSTER,
 PHILIP D. ROLLHAUS.